United States Patent
Torres et al.

(10) Patent No.: US 7,992,005 B2
(45) Date of Patent: Aug. 2, 2011

(54) PROVIDING PATTERN BASED USER PASSWORD ACCESS

(75) Inventors: Robert J. Torres, Colleyville, TX (US); Douglas S. Brown, Charlotte, NC (US); Jehan Moghazy, Philadelphia, PA (US); James R. Rudd, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 11/567,284

(22) Filed: Dec. 6, 2006

(65) Prior Publication Data

US 2008/0141362 A1 Jun. 12, 2008

(51) Int. Cl.
*G06F 21/00* (2006.01)
(52) U.S. Cl. .......................... 713/182; 713/184
(58) Field of Classification Search .................. 713/182, 713/184
See application file for complete search history.

(56) References Cited

U.S. PATENT DOCUMENTS

| | | | |
|---|---|---|---|
| 5,428,349 A * | 6/1995 | Baker | 340/5.54 |
| 6,148,406 A * | 11/2000 | Weisz et al. | 726/18 |
| 6,246,769 B1 | 6/2001 | Kohut | |
| 2003/0005338 A1* | 1/2003 | Solioz | 713/202 |
| 2004/0111646 A1* | 6/2004 | Little | 713/202 |
| 2006/0031174 A1 | 2/2006 | Steinmetz | |
| 2006/0078107 A1 | 4/2006 | Lee | |

\* cited by examiner

*Primary Examiner* — Jason K Gee
(74) *Attorney, Agent, or Firm* — Yee & Associates, P.C.; Mark C. Vallone; Rudolf O. Siegesmund (57) ABSTRACT

The Pattern Based Password Tool provides a user with a unique, single-use password that is hard to steal, but easy for the user to remember. The Pattern Based Password Tool assigns a password to a user, wherein the password specifies a spatial position of at least one element of a plurality of elements on a matrix. The Pattern Based Password Tool populates the plurality of elements on the matrix with randomly generated characters. After reading a password entry, the Pattern Based Password Tool verifies that the password entry is a correct combination of the characters from the plurality of elements on the matrix that correspond to the spatial position of the at least one element as specified by the password.

22 Claims, 5 Drawing Sheets

| | 1 | 2 | 3 | 4 | 5 | |
|---|---|---|---|---|---|---|
| 1 | 12 <u>711</u> | 13 <u>712</u> | 16 <u>713</u> | 19 <u>714</u> | 13 <u>716</u> | |
| 2 | 21 <u>721</u> | 11 <u>722</u> | 22 <u>723</u> | 16 <u>724</u> | 6 <u>726</u> | |
| 3 | 15 <u>731</u> | 23 <u>732</u> | 38 <u>733</u> | 6 <u>734</u> | 8 <u>736</u> | |
| 4 | 22 <u>741</u> | 15 <u>742</u> | 23 <u>743</u> | 12 <u>744</u> | 17 <u>746</u> | |
| 5 | 17 <u>751</u> | 12 <u>752</u> | 22 <u>753</u> | 21 <u>754</u> | 17 <u>756</u> | |
| 6 | 20 <u>761</u> | 18 <u>762</u> | 7 <u>763</u> | 12 <u>764</u> | 7 <u>766</u> | |

PROVIDING PATTERN BASED USER PASSWORD ACCESS

FIELD OF THE INVENTION

The invention relates generally to the field of information security and relates specifically to pattern based user passwords.

BACKGROUND OF THE INVENTION

Bank customers using an automated teller machine (ATM) generally enter a four-digit numerical personal identification number (PIN), hereafter called a password, to access their bank account or conduct banking transactions. Banks assign the password to the customer when an account is opened. The password might never change for as long as the customer owns the account. A short numerical password is easy for the customer to remember, but is also easy to steal. Thieves can steal the customer's password by watching as the customer enters the password. Thieves can then use the stolen password to gain unauthorized access to the customer's bank account.

One solution to prevent theft of a password is to assign single-use passwords that expire after being used once. If a thief observes a customer using a singe-use password, the stolen single-use password is useless for accessing the customer's bank account, because the single-use password expires after being used by the customer. Assigning single-use passwords presents logistical and practical challenges. The bank needs an efficient method of distributing the single-use password. The customer needs a way to remember the single-use password. The method of distribution and the way of remembering needs to be secure, to preserve the secrecy of the single-use password.

One known method of assigning single-use passwords is to use a rotating code on compact electronic display device. The rotating code corresponds to a rotating code on the bank's computer system, such that the rotating code on the compact electronic display matches the rotating code on the bank's computer system. A problem with this method is that if the compact electronic display is lost the customer cannot access the account. If the compact electronic device is stolen, the customer cannot access the account, but the thief can. A need exists for a way to provide a customer, or any user of computerized passwords, with a unique, single-use password that is hard to steal, but easy for the customer to remember.

SUMMARY OF THE INVENTION

The Pattern Based Password Tool provides a user with a unique, single-use password that is hard to steal, but easy for the user to remember. The Pattern Based Password Tool assigns a password to a user, wherein the password specifies a spatial position of at least one element of a plurality of elements on a matrix. The Pattern Based Password Tool populates the plurality of elements on the matrix with randomly generated characters. After reading a password entry, the Pattern Based Password Tool verifies that the password entry is a correct combination of the characters from the plurality of elements on the matrix that correspond to the spatial position of the at least one element as specified by the password. Because the matrix is repopulated with randomly generated characters every time the user accesses the account, the user enters a different password entry every time the user accesses the account. A thief would not be able to determine the pattern and steal the pattern based password by casually observing the password entry.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Pattern Based Password Tool"

Figure 1:
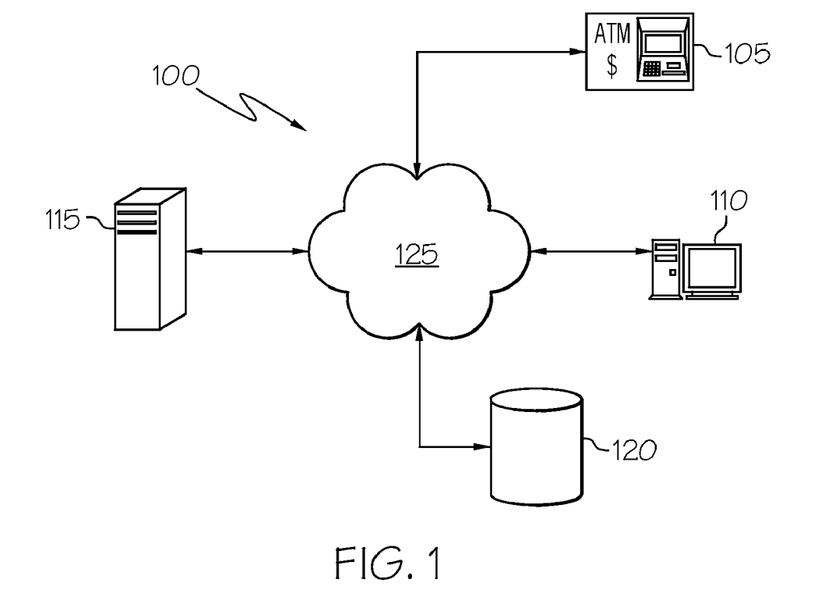
FIG. 1 is an exemplary computer network.

Additionally, the Pattern Based Password Tool is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including ATM 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
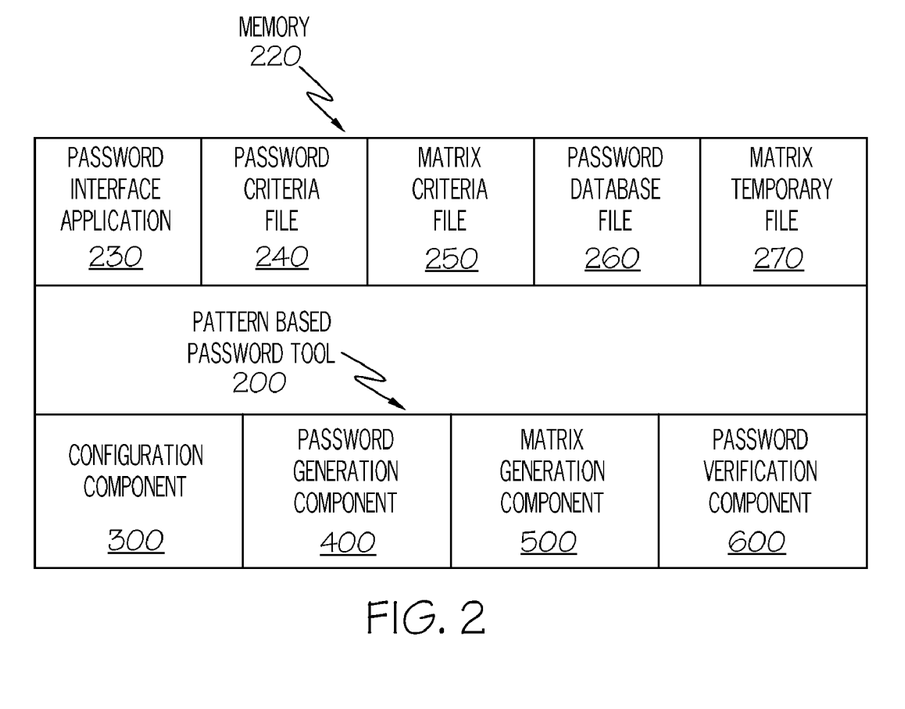
FIG. 2 describes files and programs in a memory on a computer.

Pattern Based Password Tool 200 typically is stored in a memory, represented schematically as memory 220 in FIG. 2.

The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, Pattern Based Password Tool 200 may reside in more than one memory distributed across different computers, servers, logical partitions, or other hardware devices. The elements depicted in memory 220 may be located in or distributed across separate memories in any combination, and Pattern Based Password Tool 200 may be adapted to identify, locate and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular importance to Pattern Based Password Tool 200, memory 220 may include an existing program, password interface application 230, with which Pattern Based Password Tool 200 interacts. Password interface application 230 comprises of existing software infrastructure for operating a user password system, such as assigning and verifying user passwords for a network of ATMs. Pattern Based Password Tool 200 interacts with several data files, including: password criteria file 240, matrix criteria file 250, password database file 260, and matrix temporary file 270. Pattern Based Password Tool 200 is described as having four components, each component interfacing with or operating seamlessly with password interface application 230. The four components of Pattern Based Password Tool 200 are configuration component 300, password generation component 400, matrix generation component 500, and password verification component 600.

Figure 3:
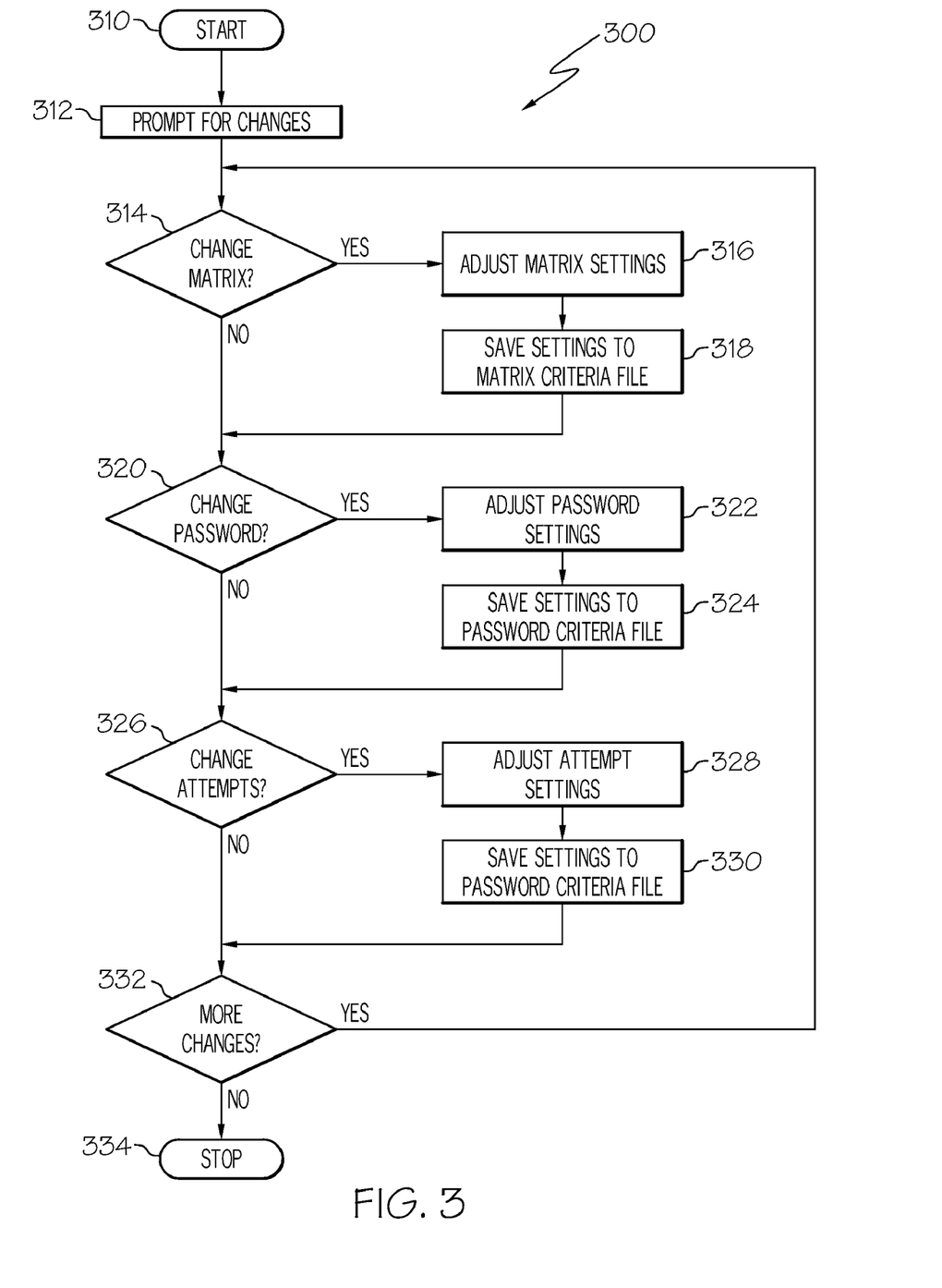
FIG. 3 is a flowchart of a configuration component.

A flowchart of configuration component 300 is shown in FIG. 3. Configuration component 300 starts when initiated by a systems administrator or another person responsible for setting parameters for Pattern Based Password Tool 200 (310). Configuration component 300 displays prompts for items that can be changed by the systems administrator (312). For example, configuration component 300 may have radio buttons or drop down menus that allow the systems administrator to change settings for the items. Configuration component 300 determines if the systems administrator wants to change the matrix settings (314). Matrix settings may include the number of rows and columns used to make up the matrix, and a range of elements that make up the matrix, such as a numerical range. If the systems administrator wants to change the matrix settings, the systems administrator adjusts the matrix settings (316) and configuration component 300 saves the settings to matrix criteria file 250 (318). Configuration component 300 determines if the systems administrator wants to change the password settings (320). Password settings may include the password length or other criteria necessary for generating a pattern based password the corresponds to spatial positions on the matrix. The password criteria is also dependant on the matrix settings, because the pattern may be affected by the number of available rows and columns used by the matrix. If the systems administrator wants to change the password settings, the systems administrator adjusts the password settings (322) and configuration component 300 saves the settings to password criteria file 240 (324). Configuration component 300 determines if the systems administrator wants to change the attempt settings (326). Attempt settings may include the allowed number of attempts that a customer may get a password wrong before being locked out, or a time limit between attempts. If the systems administrator wants to change the attempt settings, the systems administrator adjusts the attempt settings (328) and configuration component 300 saves the settings to password criteria file 240 (330). Configuration component 300 determines if the systems administrator wants to change more settings (332). If the systems administrator wants to change more settings, configuration component 300 goes to step 314, otherwise, configuration component 300 stops (334).

Figure 4:
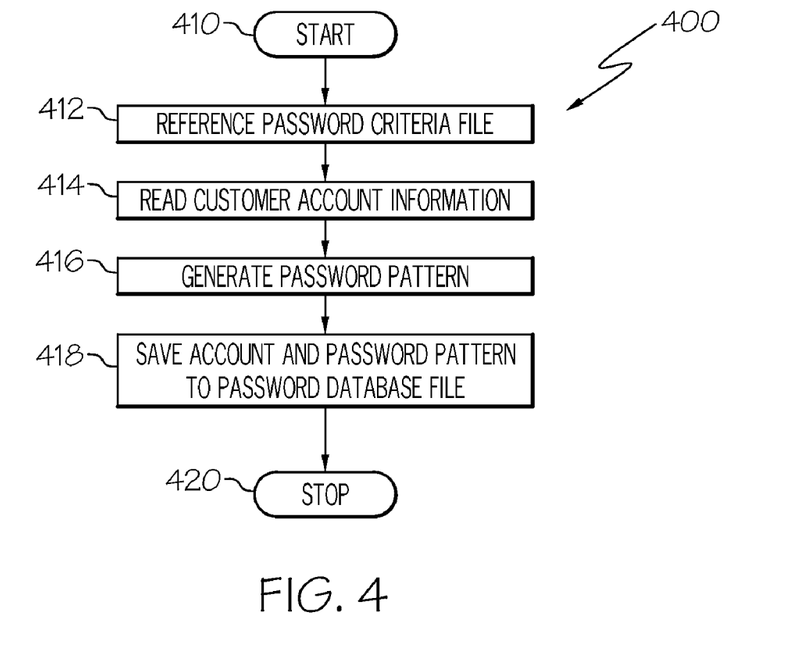
FIG. 4 is a flowchart of a password generation component.

A flowchart of a password generation component 400 is shown in FIG. 4. Password generation component 400 starts whenever a password is assigned to a customer as part of password interface application 230 (410). Password generation component 400 references password criteria file 240 to determine the criteria for setting the pattern-based password (412). Password generation component 400 reads the customer account information associated with the pattern based password (414). Password generation component 400 generates a random, unique pattern based password using the settings saved in password criteria file 240 (416). In an alternative embodiment, the customer can select a pattern based password that meets the settings saved in password criteria file. Customer selected passwords can be selected from a list of pattern based passwords generated by password generation component 400, or the customer may create a pattern and the customer created pattern is verified by password generation component 400. Password generation component 400 saves the pattern-based password and associated account information to password database file 260 (418) and stops (420).

In one embodiment of Pattern Based Password Tool 200, password database file 260 is saved on a networked storage device, such as persistent storage 120. In another embodiment of Pattern Based Password Tool 200, password database file 260 is saved on a machine readable media, such as a magnetic strip or embedded microchip on an ATM card. In yet another embodiment Pattern Based Password Tool 200, a portion of password database file 260 is saved on a networked storage device, and the remaining portion is saved on a machine readable media. In a further embodiment of Pattern Based Password Tool 200, the customer can customize the security of their pattern based password using configuration component 300. For example, the customer can chose a complex pattern or large matrix to create a custom criteria set for their pattern based password. The custom criteria set can be saved to password database file 260.

Figure 5:
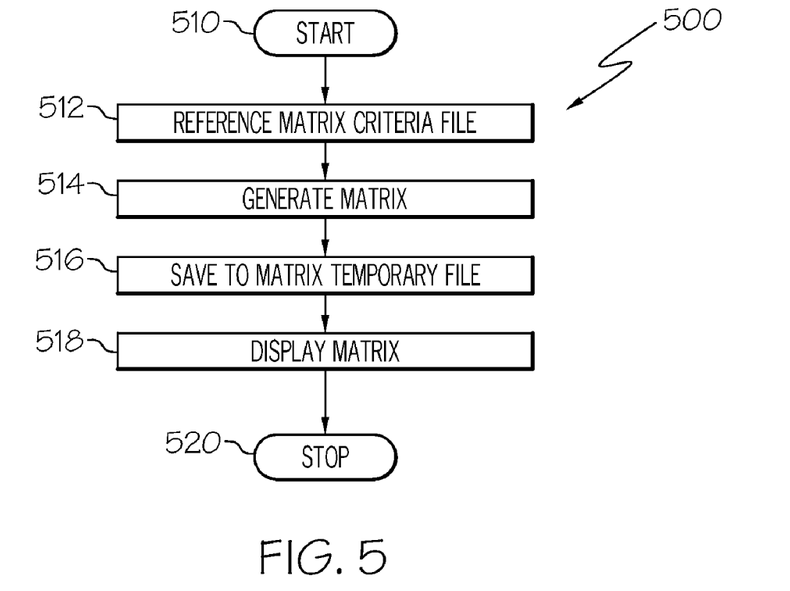
FIG. 5 is a flowchart of a matrix generation component.

A flowchart of a matrix generation component 500 is shown in FIG. 5. Matrix generation component 500 starts whenever a customer attempts to access an account on ATM 105 using password interface application 230 (510). Matrix generation component 500 references matrix criteria file 250 (512) and generates a random, unique matrix that meets the settings in matrix criteria file 250 (514). Matrix generation component 500 saves the generated matrix to matrix temporary file 270 (516) and displays the generated matrix on password interface application on ATM 105 (158). After displaying the generated matrix, matrix generation component 500 stops (520).

Figure 6:
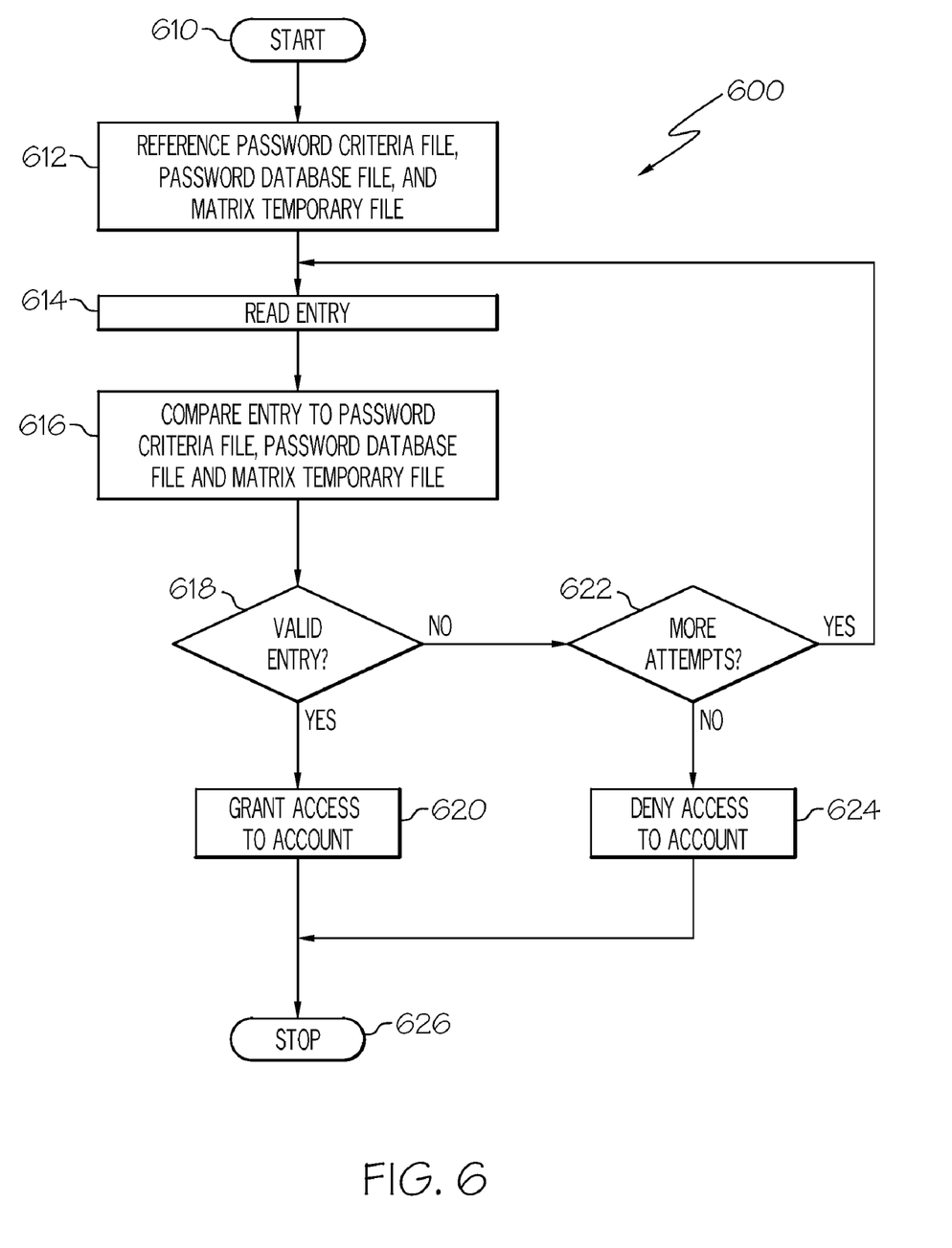
FIG. 6 is a flowchart of a password verification component.

A flowchart of a password verification component 600 is shown in FIG. 6. Password verification component 600 starts whenever a customer attempts to access an account on ATM 105 using password interface application 230, after the generated matrix is displayed (610). Password verification component 600 references password criteria file 240, password database file 260, and matrix temporary file 270 (612). Password verification component 600 reads a customer's password entry (614). Password verification component 600 compares the customer's password entry to password criteria file 240, password database file 260, and matrix temporary file 270 (616) and determines if the customer's password entry is valid (618). Addition information may be used during the verification, such as a user name or account number entered by the customer or stored on a machine readable media, such as a magnetic strip or embedded microchip on an ATM card. If the customer's password entry is valid, password verification component 600 grants access to the account (620) and stops (626). If the customer's password entry is not valid, password verification component determines if the customer can make more attempts (622). If the customer can make more attempts, password verification component 600 goes to step 614. If the customer can not make more attempts, password verification component 600 denies access to the customer's account (624) and stops (626).

Figure 7:
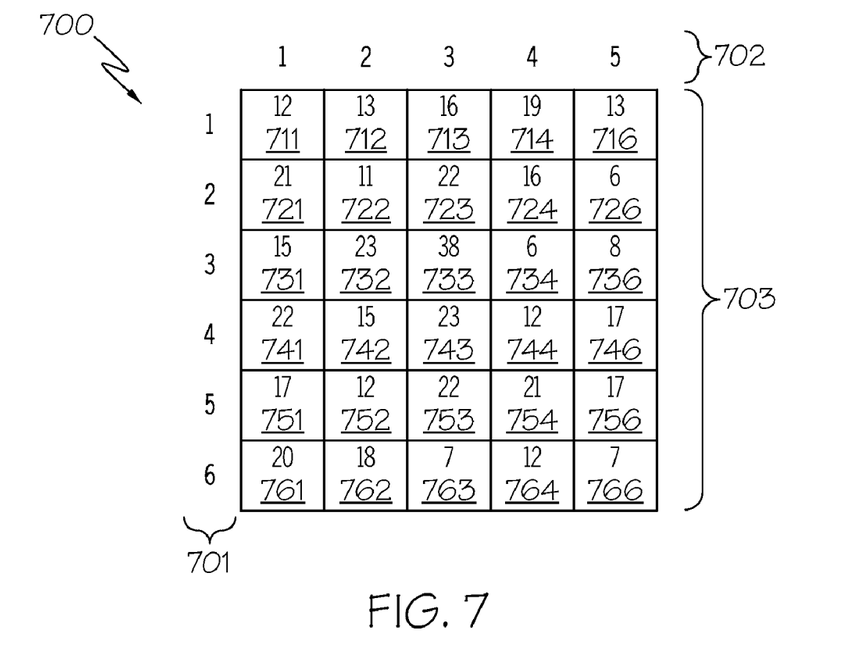
FIG. 7 is an exemplary matrix.

Exemplary matrix 700 is shown in FIG. 7. Matrix 700 has a plurality of row labels 701 and a plurality of column labels 702. At the intersection of each of the plurality of rows and plurality of columns is one of a plurality of elements 703. Each of the plurality of elements 703 is a randomly generated character, in this case, a number within the range specified in matrix criteria file 250. Each of the plurality of elements 703 can be represented by the row number and column number of the element. For example element 752 is at the intersection of row 5 and column 2. The intersection of row 5 and column 2 can be represented by the symbol [5:2]. Element 752 in matrix 700 has a value of 12.

A customer using Pattern Based Password Tool is assigned an exemplary pattern based password "23+" that relates to the special position of elements in matrix 700. Pattern based password "23+" has three parts. The first part the password is the number "2" representing a first element 722 [2:2] in matrix 700. The second part of the password is the number "3" representing a second element 733 [3:3] in matrix 700. The third part of the password is the operator "+" indicating an addition operation should be applied to the first part and the second part. Based on the pattern "23+," first element 722 [2:2] should be added to first adjacent element 723 [2:3] to the right of first element 722 [2:2], and second element 733 [3:3] should be added to second adjacent element 734 [3:4] to the right of second element 733 [3:3]. Thus, the customer with pattern based password "23+" would enter password entry "3344" based on matrix 700.

Figure 8:
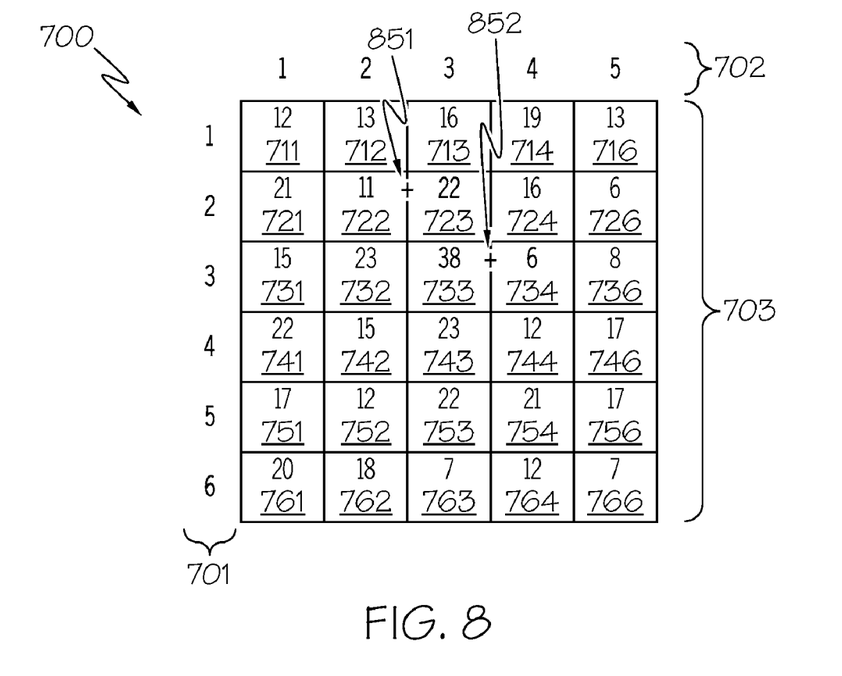
FIG. 8 shows a pattern-based password applied to an exemplary matrix.

FIG. 8 shows how the entry "3344" corresponds with pattern based password "23+" and matrix 700. Sum 851 shows the addition of the elements 722 [2:2] and 723 [2:3]. Sum 851 equals 33, and corresponds with the first part of pattern based password "23+." Sum 852 shows the addition of the elements 733 [3:3] and 734 [3:4]. Sum 852 equals 44, and corresponds with the second part of pattern based password "23+." The customer enters the value of sum 851 and the value of sum 852 as the password entry. Thus, password entry "3344" is the corresponding password entry for pattern based password "23+" and matrix 700.

A preferred form of the invention has been shown in the drawings and described above, but variations in the preferred form will be apparent to those skilled in the art. Pattern Based Password Tool 200 can be applied to any computerized user password system, such as an individual computer or electronic device, a private computer network or to a network accessed via the World Wide Web. Pattern Based Password Tool 200 is particularly useful for passwords used in public places such as on electronic door locks or gate locks, electronic point of sale interfaces, and computers available for public use. Other patterns can be created that combine spatial relationships with other mathematical operations, such as multiplication or subtraction, or patterns may require a more complex combination of elements in a matrix. Similarly, patterns can be based on a matrix comprising of characters such as letters or pictures. The preceding description is for illustration purposes only, and the invention should not be construed as limited to the specific form shown and described. The scope of the invention should be limited only by the language of the following claims.

What is claimed is:

1. A method for providing pattern based password access, the method comprising:
   a computer assigning a pattern based password to a user, wherein the pattern based password specifies a first matrix position of a first element of a plurality of elements on a matrix, a second matrix position of a second element of the plurality of elements on the matrix, and an operation, wherein the first matrix position is different from the second matrix position, and wherein the matrix has at least two rows and at least two columns;
   the computer populating the plurality of elements on the matrix with randomly generated characters;
   the computer displaying the matrix populated with the randomly generated characters on a display;
   the computer receiving a password entry from the user, wherein the password entry is determined by performing the operation on at least a first set of characters of the randomly generated characters displayed in the first matrix position on the display and on at least a second set of characters of the randomly generated characters displayed in the second matrix position on the display;
   the computer, responsive to receiving the password entry of the user, performing the operation on at least a first set of the randomly generated characters populated in the first element and a second set of the randomly generated characters populated in the second element to determine a processor generated password;
   the computer verifying that the password entry of the user matches the processor generated password; and
   the computer, responsive to verifying that the password entry of the user matches the processor generated password, granting an access to the user.

2. The method of claim 1 wherein the randomly generated characters are a plurality of numbers, wherein the first set of the randomly generated characters comprises one or more numbers, and wherein the second set of the randomly generated characters comprises one or more numbers.

3. The method of claim 2 wherein the computer performing the operation comprises:
   the computer adding a third set of the randomly generated characters populated in a third element in a third matrix position of the matrix to the first set of the randomly generated characters populated in the first element to produce a first sum; and
   the computer adding a fourth set of the randomly generated characters populated in a fourth element in a fourth matrix position of the matrix to the second set of the randomly generated characters populated in the second element to produce a second sum.

4. The method of claim 3 wherein the password entry comprises the first sum and the second sum.

5. The method of claim 3 wherein the first matrix position is adjacent to the third matrix position, and wherein the second matrix position is adjacent to the fourth matrix position.

6. The method of claim 1 wherein the randomly generated characters are letters.

7. The method of claim 1 wherein the randomly generated characters are pictures.

8. A computer system for providing pattern based password access, the system comprising:

one or more processors, one or more computer-readable memories and one or more computer-readable, tangible storage devices;

program instructions, stored on at least one of the one or more computer-readable, tangible storage devices for execution by at least one of the one or more processors via at least one of the one or more memories, to assign a pattern based password to a user, wherein the pattern based password specifies a first matrix position of a first element of a plurality of elements on a matrix, a second matrix position of a second element of the plurality of elements on the matrix, and an operation, wherein the first matrix position is different from the second matrix position, and wherein the matrix has at least two rows and at least two columns;

program instructions, stored on at least one of the one or more computer-readable, tangible storage devices for execution by at least one of the one or more processors via at least one of the one or more memories, to populate the plurality of elements on the matrix with randomly generated characters;

program instructions, stored on at least one of the one or more computer-readable, tangible storage devices for execution by at least one of the one or more processors via at least one of the one or more memories, to display the matrix populated with the plurality of randomly generated characters on a display;

program instructions, stored on at least one of the one or more computer-readable, tangible storage devices for execution by at least one of the one or more processors via at least one of the one or more memories, to receive a password entry from the user, wherein the password entry is determined by performing the operation on at least a first set of characters of the randomly generated characters displayed in the first matrix position on the display and on at least a second set of characters of the randomly generated characters displayed in the second matrix position on the display;

program instructions, stored on at least one of the one or more computer-readable, tangible storage devices for execution by at least one of the one or more processors via at least one of the one or more memories, to perform, responsive to receiving the password entry of the user, the operation on at least a first set of the randomly generated characters populated in the first element and a second set of the randomly generated characters populated in the second element to determine a processor generated password;

program instructions, stored on at least one of the one or more computer-readable, tangible storage devices for execution by at least one of the one or more processors via at least one of the one or more memories, to verify that the password entry of the user matches the processor generated password;

program instructions, stored on at least one of the one or more computer-readable, tangible storage devices for execution by at least one of the one or more processors via at least one of the one or more memories, to grant, responsive to verifying that the password entry of the user matches the processor generated password, an access to the user.

9. The computer system of claim 8 wherein the randomly generated characters are a plurality of numbers, wherein the first set of the randomly generated characters comprises one or more numbers, and wherein the second set of the randomly generated characters comprises one or more numbers.

10. The computer system of claim 9 wherein the program instructions to perform the operation:

add a third set of the randomly generated characters populated in a third element in a third matrix position of the matrix to the first set of the randomly generated characters populated in the first element to produce a first sum; and add a fourth set of the randomly generated characters populated in a fourth element in a fourth matrix position of the matrix to the second set of the randomly generated characters populated in the second element to produce a second sum.

11. The computer system of claim 10 wherein the password entry is comprises the first sum and the second sum.

12. The computer system of claim 10 wherein the first matrix position is adjacent to the third matrix position, and wherein the second matrix position is adjacent to the fourth matrix position.

13. The computer system of claim 8 wherein the randomly generated characters are letters.

14. The computer system of claim 8 wherein the randomly generated characters are pictures.

15. A computer program product for providing pattern based password access, the computer program product comprising:

a one or more computer-readable, tangible storage devices;

program instructions, stored on at least one of the one or more computer-readable, tangible storage devices, to assign a pattern based password to a user, wherein the pattern based password specifies a first matrix position of a first element of a plurality of elements on a matrix, a second matrix position of a second element of the plurality of elements on the matrix, and an operation, wherein the first matrix position is different from the second matrix position, and wherein the matrix has at least two rows and at least two columns;

program instructions, stored on at least one of the one or more computer-readable, tangible storage devices, to populate the plurality of elements on the matrix with randomly generated characters;

program instructions, stored on at least one of the one or more computer-readable, tangible storage devices, to display the matrix populated with the plurality of randomly generated characters on a display;

program instructions, stored on at least one of the one or more computer-readable, tangible storage devices, to receive a password entry from a user, wherein the password entry is determined by performing the operation on at least a first set of characters of the randomly generated characters displayed in the first matrix position on the display and on at least a second set of characters of the randomly generated characters displayed in the second matrix position on the display;

program instructions, stored on at least one of the one or more computer-readable, tangible storage devices, to perform, responsive to receiving the password entry of the user on the display, the operation on at least a first set of the randomly generated characters populated in the first element and a second set of the randomly generated characters populated in the second element to determine a processor generated password;

program instructions, stored on at least one of the one or more computer-readable, tangible storage devices, to verify that the password entry of the user matches the processor generated password; and program instructions, stored on at least one of the one or more computer-readable, tangible storage devices, to grant, responsive to verifying that the password entry of the user matches the processor generated password, an access to the user.

16. The computer program product of claim 15 wherein the randomly generated characters are a plurality of numbers, wherein the first set of the randomly generated characters comprises one or more numbers, and wherein the second set of the randomly generated characters comprises one or more numbers.

17. The computer program product of claim 16 wherein the program instructions to perform the operation:
   add a third set of the randomly generated characters populated in a third element in a third matrix position of the matrix to the first set of the randomly generated characters populated in the first element to produce a first sum; and
   add a fourth set of the randomly generated characters populated in a fourth element in a fourth matrix position of the matrix to the second set of the randomly generated characters populated in the second element to produce a second sum.

18. The computer program product of claim 17 wherein the password entry comprises the first sum and the second sum.

19. The computer program product of claim 17 wherein the first matrix position is adjacent to the third matrix position, and wherein the second matrix position is adjacent to the fourth matrix position.

20. The computer program product of claim 15 wherein the randomly generated characters are letters.

21. A computer system comprising one or more processors, one or more computer-readable memories, one or more computer-readable, tangible storage devices and program instructions which are stored on the one or more computer-readable, tangible storage devices for execution by the one or more processors via the one or more memories and when executed by the one or more processors, perform the method of claim 1.

22. A computer program product comprising one or more computer-readable, tangible storage devices and computer-readable program instructions which are stored on the one or more computer-readable, tangible storage devices and when executed by the one or more processors, perform the method of claim 1.

* * * * *